(12) United States Patent
Abe et al.

(10) Patent No.: US 7,781,106 B2
(45) Date of Patent: Aug. 24, 2010

(54) LITHIUM SECONDARY CELL AND ITS NONAQUEOUS ELECTROLYTE

(75) Inventors: Koji Abe, Ube (JP); Kazuhiro Miyoshi, Ube (JP); Takaaki Kuwata, Ube (JP); Yasuo Matsumori, Ube (JP)

(73) Assignee: UBE Industries, Ltd., Ube-shi (JP)

( * ) Notice: Subject to any disclaimer, the term of this patent is extended or adjusted under 35 U.S.C. 154(b) by 1204 days.

(21) Appl. No.: 10/567,902

(22) PCT Filed: Aug. 9, 2004

(86) PCT No.: PCT/JP2004/011714

§ 371 (c)(1),
(2), (4) Date: Feb. 10, 2006

(87) PCT Pub. No.: WO2005/015677

PCT Pub. Date: Feb. 17, 2005

(65) Prior Publication Data

US 2006/0246356 A1 Nov. 2, 2006

(30) Foreign Application Priority Data

Aug. 11, 2003 (JP) .............................. 2003-291129
Nov. 13, 2003 (JP) .............................. 2003-383406

(51) Int. Cl.
*H01M 6/16* (2006.01)

(52) U.S. Cl. ................... 429/334; 429/340; 429/332; 429/331; 429/330; 429/231.1; 429/231.8; 429/231.4; 429/231.3

(58) Field of Classification Search .............. 429/231.1, 429/231.8, 231.4, 231.3, 330, 331, 332, 334, 429/340

See application file for complete search history.

(56) References Cited

U.S. PATENT DOCUMENTS

2005/0250007 A1 * 11/2005 Abe et al. ................... 429/330

FOREIGN PATENT DOCUMENTS

| JP | 7-272756 | | 10/1995 |
|---|---|---|---|
| JP | 8-45545 | | 2/1996 |
| JP | 08/321311 | | 12/1996 |
| JP | 9-199172 | | 7/1997 |
| JP | 09-199172 | * | 7/1997 |
| JP | 2000-003724 | | 1/2000 |
| JP | 2000-3724 | | 1/2000 |
| JP | 2002-367674 | * | 12/2002 |
| WO | WO 2004/012295 | * | 2/2004 |

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

The invention provides a lithium secondary battery which is excellent in long-term cycle property and in battery characteristics, such as electric capacity and storage property, and a nonaqueous electrolytic solution usable for such a lithium secondary battery. The present invention relates to a lithium secondary battery including a positive electrode, a negative electrode, and a nonaqueous electrolytic solution containing an electrolyte salt dissolved in a nonaqueous solvent, characterized in that the positive electrode is made of a material including a lithium compound oxide, in that the negative electrode is made of a material including graphite, and in that the nonaqueous electrolytic solution contains dialkyl oxalate and further contains vinylene carbonate and/or 1,3-propanesultone, and a nonaqueous electrolytic solution for use in such a battery.

21 Claims, No Drawings

LITHIUM SECONDARY CELL AND ITS NONAQUEOUS ELECTROLYTE

This application is a 371 of PCT/JP04/11714 filed Aug. 9, 2004.

TECHNICAL FIELD

The present invention relates to a lithium secondary battery which is excellent in a long-term battery cycle property and in battery characteristics, such as electric capacity and storage property, and to a nonaqueous electrolytic solution usable for such a lithium secondary battery.

BACKGROUND ART

In recent years, lithium secondary batteries have been widely used as a power source for small-sized electronic apparatuses. A lithium secondary battery is mainly composed of a positive electrode, a nonaqueous electrolytic solution and a negative electrode. In particular, a lithium secondary battery composed of a lithium compound oxide such as $LiCoO_2$ as a positive electrode and a carbon material or a lithium metal as a negative electrode is suitably employed. As a nonaqueous electrolytic solution of such a lithium secondary battery, a carbonate such as ethylene carbonate (EC) or propylene carbonate (PC) is suitably used.

There is, however, a demand for secondary batteries having further improved battery characteristics such as cyclic property and electric capacity.

A lithium secondary battery using, for example, $LiCoO_2$, $LiMn_2O_4$ or $LiNiO_2$ as a positive electrode brings about a reduction of its battery performance, when a part of the solvent of the nonaqueous electrolytic solution locally undergoes an oxidative decomposition during the charging, because the decomposed product hinders the desired electrochemical reaction. Such a reduction is considered to be attributed to an electrochemical oxidation of the solvent in the interface between the positive electrode material and the nonaqueous electrolytic solution.

Also, a lithium secondary battery using, for example, a highly crystalline carbon material, such as natural graphite or artificial graphite, as a negative electrode brings about a reduction of its battery performance, when the solvent of the nonaqueous electrolytic solution undergoes a reductive decomposition at the surface of the negative electrode during the charging. Even in the case of EC which is generally used as a solvent for the nonaqueous electrolytic solution, a part thereof undergoes a reductive decomposition during repeated charging and discharging.

For the purpose of improving the battery characteristics of such lithium secondary batteries, Japanese Unexamined Patent Publication JP-A-H08-96849 discloses use of an aliphatic saturated dicarboxylic ester such as dipropyl adipate and that the content of the ester in the solvent is preferably at least 5% by volume. In Example 1, the Japanese publication discloses a battery using 10% by volume of dimethyl adipate. The cycle property of the battery is, however, about 65% after 15 cycles and is not satisfactory.

Japanese Unexamined Patent Publication JP-A-H08-321311 discloses use of various organic compounds such as ketones, alcohols, aldehydes, esters, organic acids and organic silicon compounds in an amount of 1 to 20% by volume in a primary battery for the purpose of improving the storage characteristics thereof. In particular, the Japanese publication proposes an attempt to improve the storage characteristics of the primary battery, such as the self discharging rate, by the addition of a dialkyl oxalate such as dimethyl oxalate- or diethyl oxalate as the above organic compound. No consideration of a secondary battery is, however, made in the Japanese publication. The constitution of the electrode materials and the nonaqueous electrolytic solution used in the Japanese publication differs from those of a secondary battery.

Japanese Unexamined Patent Publication JP-A-H09-199172 discloses use of at least 1% by volume, preferably 20 to 80% by volume, of a dialkyl oxalate containing an alkyl group having 1 to 3 carbon atoms. Although the cycle property under conditions of a high voltage and a high load discharging is improved, the retention of the discharge capacity at the 100 cycles is only 82 to 92% of the discharge capacity at the 10 cycles.

Japanese Unexamined Patent Publication JP-A-H08-45545 discloses a lithium battery which includes a negative electrode containing a carbon material having a crystallization degree of greater than 0.8, and an electrolytic solution containing a lithium salt and an organic solvent mixture composed of the first solvent such as propylene carbonate, the second solvent such as dimethyl carbonate or diethyl carbonate and vinylene carbonate (VC) and which suppresses delamination of the carbon material. The cycle property of the battery, however, is not satisfactory.

Japanese Unexamined Patent Publication JP-A-2002-367674 discloses an electrolytic solution containing a lithium salt dissolved in a solvent composed mainly of at least one nonaqueous solvent selected from the group consisting of carbonic esters, ethers and lactones, and the electrolytic solution being characterized in that the solvent further contains a diester of a dicarboxylic acid and an aromatic compound such as dibenzofuran. No substantial consideration is made in the Japanese publication with respect to cycle property.

Japanese Unexamined Patent Publication JP-A-2000-3724 discloses a lithium secondary battery which is characterized in that the positive electrode is made of a material containing a lithium compound oxide, in that the negative electrode is made of a material containing graphite, in that the nonaqueous solvent contains as main ingredients a cyclic carbonate and a linear carbonate and in that the nonaqueous solvent further contains not less than 0.1% by weight but not more than 4% by weight of 1,3-propanesultone and/or 1,4-butanesultone. However the retention of the discharge capacity after 50 cycles at room temperature is 82 to 95%. Thus, an improvement of the long-term cycle property is demanded.

It is the object of the present invention to provide a lithium secondary battery which is excellent in long-term cycle property and in battery characteristics, such as electric capacity and storage property in charged condition, and to provide a nonaqueous electrolytic solution usable for such a lithium secondary battery to solve the problems of the above described nonaqueous electrolytic solution for lithium secondary batteries.

DISCLOSURE OF THE INVENTION

The present inventors have made a study with a view toward solving the above problems. As a result, it has been found that particularly a long-term cycle property of a lithium secondary battery is improved by incorporating, as additives, a dialkyl oxalate together with vinylene carbonate and/or 1,3-propanesultone into a nonaqueous electrolytic solution.

Thus, it is an object of the present invention to provide a lithium secondary battery comprising a positive electrode, a negative electrode, and a nonaqueous electrolytic solution containing an electrolyte salt dissolved in a nonaqueous solvent, characterized in that said positive electrode is made of a material including a lithium compound oxide, in that said negative electrode is made of a material including graphite, and in that said nonaqueous electrolytic solution contains dialkyl oxalate and further contains vinylene carbonate and/or 1,3-propanesultone.

PREFERRED EMBODIMENT FOR CARRYING OUT THE INVENTION

In the present invention, when the content of the dialkyl oxalate used in conjunction with vinylene carbonate (VC) and/or 1,3-propanesultone (PS) in the nonaqueous electrolytic solution is excessively high, the battery characteristics are occasionally reduced. When the content is excessively low, on the other hand, desired sufficient battery characteristics may not be obtainable. Accordingly, the content is generally 0.01 to 10% by weight, preferably 0.1 to 4% by weight, particularly preferably 0.5 to 3% by weight, based on the weight of the nonaqueous electrolytic solution from the standpoint of the effect of improving the cycle property.

As the alkyl group of the dialkyl oxalate contained in the nonaqueous electrolytic solution of the present invention, there may be mentioned alkyl groups having 1 to 12 carbon atoms, such as a methyl group, an ethyl group, a propyl group, an isopropyl group, a butyl group, a hexyl group, an octyl group, a decyl group and a dodecyl group. As the specific examples of the dialkyl oxalate, there may be mentioned dimethyl oxalate, diethyl oxalate, dipropyl oxalate, diisopropyl oxalate, dibutyl oxalate, dihexyl oxalate, dioctyl oxalate, didecyl oxalate and didodecyl oxalate.

Above all, dimethyl oxalate has a peculiar property that it can inhibit the decomposition of propylene carbonate (PC). Therefore, when PC is used as a nonaqueous solvent for the lithium secondary battery, dimethyl oxalate is preferable from the standpoint of inhibition of PC decomposition. From the standpoint of improvement in wettability of a separator, a dialkyl oxalate containing an alkyl group having 6 to 12 carbon atoms, such as dihexyl oxalate, dioctyl oxalate, didecyl oxalate or didodecyl oxalate, is preferred.

An asymmetric dialkyl oxalate having two different alkyl groups is preferred from the standpoint of formation of a suitable coating on a negative electrode. In particular, asymmetric dialkyl oxalates having a methyl group and an alkyl group having 2 to 4 carbon atoms, such as methyl ethyl oxalate, methyl propyl oxalate and methyl butyl oxalate; and asymmetric dialkyl oxalates having an ethyl group and an alkyl group having 3 to 4 carbon atoms, such as ethyl propyl oxalate and ethyl butyl oxalate are preferred for reasons of an effect of improving cycle property and an effect of forming a suitable coating. Above all, methyl ethyl oxalate is most preferred.

Further, dialkyl oxalates containing an alkyl group having 1 or 2 carbon atoms and an alkyl group having 6 to 12 carbon atoms, such as methyl hexyl oxalate, methyl heptyl oxalate, methyl octyl oxalate, methyl nonyl oxalate, methyl decyl oxalate, methyl undecyl oxalate, methyl dodecyl oxalate, ethyl hexyl oxalate, ethyl octyl oxalate, ethyl decyl oxalate and ethyl dodecyl oxalate, are particularly preferred for reasons that they exhibit both an effect of improving the wettability of a separator and an effect of forming a suitable coating. Above all, dialkyl oxalates having a methyl group and an alkyl group having 6 to 8 carbon atoms are most preferred.

In the present invention, when the content of vinylene carbonate incorporated in the nonaqueous electrolytic solution is excessively high, the battery characteristics are occasionally reduced. When the content is excessively low, on the other hand, desired sufficient battery characteristics may not be obtainable. Accordingly, the content is generally 0.01 to 20% by weight, preferably 0.05 to 10% by weight, particularly preferably 0.1 to 5% by weight, based on the weight of the nonaqueous electrolytic solution from the standpoint of the effect of improving the cycle property.

In the present invention, when the content of 1,3-propanesultone incorporated in the nonaqueous electrolytic solution is excessively high, the battery characteristics are occasionally reduced. When the content is excessively low, on the other hand, desired sufficient battery characteristics may not be obtainable. Accordingly, the content is generally 0.01 to 20% by weight, preferably 0.05 to 10% by weight, particularly preferably 0.1 to 4% by weight, based on the weight of the nonaqueous electrolytic solution from the standpoint of the effect of improving the cycle property.

As the nonaqueous solvent used in the present invention, there may be mentioned, for example, (a) cyclic carbonates, (b) linear carbonates, (c) lactones, (d) ethers, (e) esters, (f) nitrites, (g) amides and (h) S=O containing compounds.

As the cyclic carbonate (a), at least one carbonate selected from, for example, ethylene carbonate (EC), propylene carbonate (PC), butylene carbonate (BC), dimethylvinylene carbonate (DMVC) and vinyl ethylene carbonate (VEC) is preferred. Above all, it is preferred that the solvent contains ethylene carbonate (EC) or propylene carbonate (PC).

As the linear carbonate (b), at least one carbonate selected from dimethyl carbonate (DMC), methyl ethyl carbonate (MEC), diethyl carbonate (DEC), methyl propargyl carbonate (MPC), ethyl propargyl carbonate (EPC), dipropargyl carbonate (DPC), dipropyl carbonate, methyl butyl carbonate and dibutyl carbonate is preferred. Above all, it is preferred that the solvent contains dimethyl carbonate (DMC), methyl ethyl carbonate (MEC), diethyl carbonate (DEC) or methyl propargyl carbonate (MPC). It is most preferred that the solvent contains methyl ethyl carbonate.

As the lactone (c), there may be mentioned γ-butyrolactone (GBL), γ-valerolactone and α-angelicalactone.

As the ether (d), there may be mentioned tetrahydrofuran, 2-methyltetrahydrofuran, 1,4-dioxane, 1,2-diethoxyethane and 1,2-dibutoxyethane.

As the ester (e), there may be mentioned methyl propionate, methyl pivalate, butyl pivalate, and octyl pivalate.

As the nitrile (f), there may be mentioned acetonitrile. As the amide (g), there may be mentioned dimethylformamide. As the S=O containing compound (h), there may be mentioned propagyl metanesulfonate, glycol sulfite, propylene sulfite, glycol sulfate, propylene sulfate, dipropargyl sulfite, methyl propargyl sulfite, divinyl sulfone and 1,4-butanediol dimethane sulfonate.

As the combination of these nonaqueous solvents, there may be mentioned various combinations such as a combination of cyclic carbonate (a) with linear carbonate (b), a combination of cyclic carbonate (a) with lactone (c), a combination of cyclic carbonate (a) with linear carbonate (b) and lactone (c), a combination of cyclic carbonate (a) with linear carbonate (b) and ether (d), a combination of cyclic carbonate (a) with linear carbonate (b) and ester (e).

Above all, it is preferred that the solvent includes a combination of cyclic carbonate (a) with linear carbonate (b) When a combination of cyclic carbonate (a) with linear carbonate (b) is used, the volume ratio $[(a)/\{(a)+(b)\}]$ is generally 0.1 to 1, preferably 0.2 to 0.4, particularly preferably 0.25 to 0.35, from the standpoint of an improvement of the cycle property.

Among the above solvent systems, a nonaqueous solvent including a combination of PC with DMC, a combination of EC with MEC or a combination of EC with DEC and having a volume ratio [(a)/{(a)+(b)}] which falls within the above specified range is particularly preferably used for a nonaqueous electrolytic solution of a lithium secondary battery, since a high cycle property is obtainable.

It is also preferred that the solvent include a combination of cyclic carbonate (a) with lactone (c). When a combination of cyclic carbonate (a) with lactone (c) is used, the volume ratio [(a)/{(a)+(c)}] is generally 0.05 to 0.8, preferably 0.1 to 0.6, particularly preferably 0.2 to 0.4, from the standpoint of an improvement of the cycle property and wettability.

Among the above solvent systems, a nonaqueous solvent including a combination of EC with GBL or a combination of VC with GBL and having a volume ratio [(a)/{(a)+(c)}] which falls within the above specified range is more preferably used for a nonaqueous electrolytic solution of a lithium secondary battery, since a high cycle property is obtainable and the wettability to a separator is improved.

It is preferred that at least one double bond-containing compound, such as dimethyl vinylene carbonate (DMVC), vinyl ethylene carbonate (VEC), α-angelicalactone and divinylsulfone, among the above nonaqueous solvents is used.

It is further preferred that the double bond-containing compound is used together with at least one triple bond-containing compound such as methyl propargyl carbonate (MPC), ethyl propargyl carbonate (EPC), dipropargyl carbonate (DPC), dipropargyl oxalate, methyl propargyl oxalate, ethyl propargyl oxalate, propargyl metanesulfonate, dipropargyl sulfite or methyl propargyl sulfite.

Particularly, although the cycle property of a high capacity battery tends to be reduced when the density of an electrode mixture thereof is made high, the use of the above-described double bond-containing compound and/or triple bond-containing compound in conjunction with the dialkyl oxalate of the present invention is preferable because the cycle property is improved.

The content of the double bond-containing compound and/or triple bond-containing compound used together with the dialkyl oxalate is advantageously 0.01 to 20% by volume, preferably 0.05 to 10% by volume, particularly preferably 0.1 to 5% by volume, based on the whole volume of the nonaqueous electrolytic solution for reasons of the effect of improving the cycle property.

As the electrolyte salt used in the present invention, there may be mentioned $LiPF_6$, $LiBF_4$, $LiClO_4$. Also, there may be mentioned lithium salts having a linear alkyl group or groups such as $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3$ (iso-$C_3F_7)_3$ and $LiPF_5$ (iso-$C_3F_7$) and lithium salts having a cyclic alkylene group or groups such as $(CF_2)_2(SO_2)_2NLi$ and $(CF_2)_3(SO_2)_2NLi$. Above all, $LiPF_6$, $LiBF_4$, $LiN(SO_2CF_3)_2$ and $LiN(SO_2C_2F_5)_2$ are preferred from the standpoint of conductivity.

These electrolyte salts may be employed singly or in combination of two or more thereof. The electrolyte salt may be used and dissolved in the nonaqueous solvent to a concentration of 0.1 to 3 M, preferably 0.5 to 2.5 M, more preferably 0.7 to 2.0 M.

The electrolytic solution of the present invention may be obtained, for example, by mixing the above nonaqueous solvents, dissolving the electrolyte salt in the mixture, dissolving dimethyl oxalate and further vinylene carbonate and/or 1,3-propanesultone therein.

By incorporating, for example, air or carbon dioxide in the nonaqueous electrolytic solution of the present invention, the generation of gases by decomposition of the electrolytic solution may be prevented and the battery characteristics such as cycle property and storage property may be improved.

As the method for incorporating (dissolving) carbon dioxide or air in the nonaqueous electrolytic solution, there may be used (1) a method in which the nonaqueous electrolytic solution is previously contacted with air or a carbon dioxide-containing gas before pouring the solution in the battery; or (2) a method in which after the solution has been poured in the battery, air or a carbon dioxide-containing gas is charged into the battery before or after sealing the battery. These methods may be used in combination. It is preferred that the moisture content of the air or carbon dioxide-containing gas is as low as possible and that the air or carbon dioxide-containing gas has a dew point of −40° C. or below, particularly preferably −50° C. or below.

The electrolytic solution of the present invention is employed as a constituent of a secondary battery, particularly lithium secondary battery. There are no limitations with respect to the constituent materials of the secondary battery other than the electrolytic solution, and various known materials can be employed.

Thus, for example, as the positive electrode active material, lithium-containing compound metal oxides with cobalt, manganese or nickel may be used. The positive electrode active materials may be used by selecting one of them or by combining two or more of them. As the compound metal oxide, there may be mentioned $LiCoO_2$, $LiMn_2O_4$, $LiNiO_2$ and $LiCo_{1-x}Ni_xO_2$ (0.01<x<1). Further, an appropriate mixture, such as a mixture of $LiCoO_2$ with $LiMn_2O_4$, a mixture of $LiCoO_2$ and $LiNiO_2$ or a mixture of $LiMn_2O_4$ and $LiNiO_2$, may be employed.

Among the above positive electrode active materials, lithium-containing compound metal oxide showing an open circuit voltage of at least 4.3 V on Li basis after completion of the charging. For example, lithium-containing compound metal oxides containing Co or Ni, such as $LiCoO_2$, $LiMn_2O_4$ and $LiNiO_2$, are most preferred. A part of these lithium-containing compound metal oxides may be substituted with another element. For example, a part of Co of $LiCoO_2$ may be substituted by an element such as Sn, Mg, Fe, Ti, Al, Zr, Cr, V, Ga, Zn or Cu.

The conductive agent for the positive electrode is not specifically limited as long as it is an electron conductive material which does not cause a chemical change. Examples of the conductive agent include graphites, such as natural graphite (such as scaly graphite) and artificial graphite, and carbon blacks, such as acetylene black, ketjen black, channel black, furnace black, lamp black and thermal black. The graphites and carbon blacks may be used as an appropriate mixture. The amount of the conductive agent added to the positive electrode mixture is preferably 1 to 10% by weight, particularly preferably 2 to 5% by weight.

The positive electrode may be manufactured by kneading the above-mentioned positive electrode active material, conductive agent such as acetylene black or carbon black, and a binder to obtain a positive electrode mixture, spreading and pressing the positive electrode material on a collector such as aluminum foil or a lath plate made of a stainless steel, and then subjected the resulting assembly to a heat treatment at a temperature of about 50 to 250° C. for about 2 hours under vacuum. As the binder, there may be mentioned polytetrafluoroethylene (PTFE), polyvinylidene fluoride (PVDF), styrene-butadiene copolymer (SBR), acrylonitrile-butadiene copolymer (NBR) and carboxymethyl cellulose (CMC).

As the negative electrode (negative electrode active material), a material capable of occluding and releasing lithium is used. Examples of the material include a lithium metal, a lithium alloy, a carbon material (for example, thermally decomposed carbon materials, cokes, graphites (such as artificial graphite and natural graphite), fired organic polymer, and carbon fibers), tin or tin compounds and silicon or silicon compounds. The carbon material preferably has a lattice spacing ($d_{002}$) of the lattice face (002) of 0.340 nm or less. It is further preferable to use a graphite having a graphite crystal structure in which the spacing is in the range of 0.335 to 0.340 nm. The negative electrode active materials may be used by selecting one of them or by combining two or more of them.

A powdery material such as a carbon material is used in the form of a negative electrode mixture after being kneaded with a binder such as ethylene-propylene-diene terpolymer (EPDM), polytetrafluoroethylene (PTFE), polyvinylidene fluoride (PVDF), styrene-butadiene copolymer (SBR), acrylonitrile-butadiene copolymer (NBR) or carboxymethyl cellulose (CMC). The method of preparing the negative electrode is not specifically limited. The negative electrode may be prepared by the same method as described above in connection with the positive electrode.

The effect of the addition of the additives of the present invention including dialkyl oxalate, vinylene carbonate and/or 1,3-propanesultone becomes higher with an increase of the density of the electrode mixture in the battery. From this point of view, the density of a layer of the positive electrode mixture formed on an aluminum foil is preferably 3.2 to 4.0 g/cm$^3$, more preferably 3.3 to 3.9 g/cm$^3$, most preferably 3.4 to 3.8 g/cm$^3$. When the density of the positive electrode mixture exceeds 4.0 g/cm$^3$, it is substantially difficult to prepare the electrode. The density of a layer of the negative electrode mixture formed on a copper foil is preferably 1.3 to 2.0 g/cm$^3$, more preferably 1.4 to 1.9 g/cm$^3$, most preferably 1.5 to 1.8 g/cm$^3$. When the density of the negative electrode mixture exceeds 2.0 g/cm$^3$, it is substantially difficult to prepare the electrode.

The thickness of the electrode layer of the positive electrode (per one side of the collector) is preferably 30 to 120 μm, more preferably 50 to 100 μm, while the thickness of the electrode layer of the negative electrode (per one side of the collector) is preferably 1 to 100 μm, more preferably 3 to 70 μm. When the thickness of the electrode material layer is less than the above range, the battery capacity is small due to a reduction of the amount of the active material in the electrode material layer. On the other hand, a thickness of the layer greater than the above range is not preferable because of a reduction of the cycle property or rate property.

There are no specific limitations with respect to the structure of the lithium secondary battery. For instance, the secondary battery may be a battery of coin type having a positive electrode, a negative electrode, and a separator of a single or plural layers, or a cylindrical or prismatic battery having a positive electrode, a negative electrode, and a separator in the form of a roll. As the separator, there can be used a known microporous film, woven fabric or non-woven fabric of a polyolefin.

The separator for the battery may be a single layer porous film or a laminate porous film. The separator for the battery used in the present invention preferably has an air permeability of 50 to 1000 seconds/100 cc, more preferably 100 to 800 seconds/100 cc, most preferably 300 to 500 seconds/100 cc, though the permeability may vary depending upon the method of fabrication thereof. Too high an air permeability causes a reduction of lithium ion conductivity so that the function as the separator for batteries cannot be fully obtained. When the permeability is excessively low, the mechanical strength is reduced. Thus, the above range is preferable.

The porosity of the separator of the battery is preferably 30 to 60%, more preferably 35 to 55%, most preferably 40 to 50%. A porosity in the above range is preferable for reasons of improved capacity characteristics of the battery.

The thickness of the separator for the battery is desirably as thin as possible, since a high energy density is obtainable. From the standpoint of the mechanical strengths and characteristics, the thickness is preferably 5 to 50 μm, more preferably 10 to 40 μm, most preferably 15 to 25 μm.

The lithium secondary battery of the present invention shows good cycle property for a long period of time even when the charge end voltage is 4.2 V or higher. Particularly, the good cycle property can be maintained even the charge end voltage is 4.3 V. The discharge end voltage can be set to 2.5 V or higher, and further to 2.8 V or higher. There is no limitation with respect to a current value, but a constant current of 0.1 to 3 C is generally utilized. The battery of the present invention may be charged and discharged in such a wide temperature range of −40° C. to 100° C. However, the charge/discharge temperature is preferably within 0 to 80° C.

To cope with an increase of the inside pressure of the lithium secondary battery of the present invention, a safety valve may be provided in a cover plate. Else, there may be adopted a method in which cuts are formed in the battery can or gasket. Further, it is preferred that the battery is provided with at least one customarily employed various safety elements such as a supercurrent preventing element, a fuse, a bimetal and a PTC element.

If necessary, a plural number of the lithium secondary batteries of the present invention may be accommodated within a battery pack in series or in parallel. Such a battery pack may be provided with a safety element such as a PTC element, a temperature fuse, fuse and/or current cut-off element, and a safety circuit such as a circuit which can monitor the voltage, temperature and current of each battery and/or whole packed batteries and which has a function to cut-off the current.

EXAMPLES

The present invention will be described in further detail below by way of Examples and Comparative Examples. However, the present invention is not restricted to these Examples in any way but, rather, includes various combinations which could be easily thought of from the gist of the invention. In particular, the present invention is not restricted only to the combinations of the solvents described in the Examples.

Example 1

Preparation of Nonaqueous Electrolytic Solution

A nonaqueous solvent having a volume ratio of propylene carbonate (PC) to dimethyl carbonate (DMC) of 1:2 was prepared. In this solvent LiPF$_6$ as an electrolyte salt was dissolved to a concentration of 1 M to obtain a nonaqueous electrolytic solution. To the nonaqueous electrolytic solution were further added dimethyl oxalate to a concentration of 0.5% by weight and vinylene carbonate (VC) to a concentration of 2% by weight.

Manufacture of Lithium Secondary Battery and Measurement of Battery Characteristics:

Ninety % by weight of LiCoO$_2$ (positive electrode active material), 5% by weight of acetylene black (conductive agent) and 5% by weight of polyvinylidene fluoride (binder)

were mixed, to which 1-methyl-2-pyrrolidone as a solvent was further added and mixed. The resulting mixture was applied to an aluminum foil, dried, compression molded and heat treated to prepare a positive electrode. On the other hand, 95% by weight of artificial graphite (negative electrode active material) of a graphite type crystal structure having a lattice spacing ($d_{002}$) of the lattice face (002) of 0.335 nm and 5% by weight of polyvinylidene fluoride (binder) were mixed, to which 1-methyl-2-pyrrolidone as a solvent was further mixed. The resulting mixture was applied to a copper foil, dried, compression molded and heat treated to prepare a negative electrode. A cylindrical battery of a 18650 size (diameter: 18 mm, height: 65 mm) was then manufactured using a microporous polypropylene film separator. After pouring the above nonaqueous electrolytic solution in the battery, air having a dew point of −60° C. was charged before sealing the battery. To the battery a pressure release vent and an internal current cut-off device (PTC device) were provided. The positive electrode had an electrode density of 3.6 g/cm$^3$, while the negative electrode had an electrode density of 1.7 g/cm$^3$. The electrode layer of the positive electrode had a thickness (per one side of the collector) of 60 µm, and the electrode layer of the negative electrode had a thickness (per one side of the collector) of 60 µm.

The 18650 battery was charged at ambient temperature (20° C.) with a constant electric current of 2.2 A (1 C) to arrive at a voltage of 4.2 V. The charging was thereafter continued for 3 hours in total under a constant voltage with an end voltage of 4.2 V. Next, the battery was discharged with a constant electric current 2.2 A (1 C) to an end voltage of 2.8 V. The charge-discharge cycles were repeated. The initial discharge capacity was nearly the same (1.00) as that of a battery in which a nonaqueous electrolytic solution using 1M LiPF$_6$ and EC/DEC (3/7 volume ratio) without dimethyl oxalate was used (Comparative Example 2). The measurement of the battery characteristics after 200 cycles revealed that the retention of discharge capacity was 84.2% of the initial discharge capacity (100%). The conditions for the preparation of the 18650 battery and the battery characteristics thereof are summarized in Table 1.

Example 2

A nonaqueous electrolytic solution was prepared and then a 18650 battery was manufactured in the same manner as that in Example 1 except that, as the additives, dimethyl oxalate was added to a concentration of 1% by weight and vinylene carbonate was added to a concentration of 2% by weight to the nonaqueous electrolytic solution. The measurement of the battery characteristics after 200 cycles revealed that the retention of discharge capacity was 85.7%. The conditions for the preparation of the 18650 battery and the battery characteristics thereof are summarized in Table 1.

Example 3

A nonaqueous electrolytic solution was prepared and then a 18650 battery was manufactured in the same manner as that in Example 1 except that, as the additives, dimethyl oxalate was added to a concentration of 2% by weight and vinylene carbonate was added to a concentration of 2% by weight to the nonaqueous electrolytic solution. The measurement of the battery characteristics after 200 cycles revealed that the retention of discharge capacity was 86.1%. The conditions for the preparation of the 18650 battery and the battery characteristics thereof are summarized in Table 1.

Example 4

A nonaqueous electrolytic solution was prepared and then a 18650 battery was manufactured in the same manner as that in Example 1 except that, as the additives, dimethyl oxalate was added to a concentration of 4% by weight and vinylene carbonate was added to a concentration of 2% by weight to the nonaqueous electrolytic solution. The measurement of the battery characteristics after 200 cycles revealed that the retention of discharge capacity was 84.3%. The conditions for the preparation of the 18650 battery and the battery characteristics thereof are summarized in Table 1.

Example 5

A nonaqueous electrolytic solution was prepared and then a 18650 battery was manufactured in the same manner as that in Example 1 except that, as the additives, dimethyl oxalate was added to a concentration of 2% by weight and vinylene carbonate was added to a concentration of 0.1% by weight to the nonaqueous electrolytic solution. The measurement of the battery characteristics after 200 cycles revealed that the retention of discharge capacity was 83.3%. The conditions for the preparation of the 18650 battery and the battery characteristics thereof are summarized in Table 1.

Example 6

A nonaqueous electrolytic solution was prepared and then a 18650 battery was manufactured in the same manner as that in Example 1 except that, as the additives, dimethyl oxalate was added to a concentration of 2% by weight and vinylene carbonate was added to a concentration of 5% by weight to the nonaqueous electrolytic solution. The measurement of the battery characteristics after 200 cycles revealed that the retention of discharge capacity was 83.4%. The conditions for the preparation of the 18650 battery and the battery characteristics thereof are summarized in Table 1.

Example 7

A nonaqueous electrolytic solution was prepared and then a 18650 battery was manufactured in the same manner as that in Example 1 except that, as the additives, dimethyl oxalate was added to a concentration of 2% by weight and 1,3-propanesultone (PS) was added to a concentration of 0.1% by weight to the nonaqueous electrolytic solution. The measurement of the battery characteristics after 200 cycles revealed that the retention of discharge capacity was 82.8%. The conditions for the preparation of the 18650 battery and the battery characteristics thereof are summarized in Table 1.

Example 8

A nonaqueous electrolytic solution was prepared and then a 18650 battery was manufactured in the same manner as that in Example 1 except that, as the additives, dimethyl oxalate was added to a concentration of 2% by weight and 1,3-propanesultone (PS) was added to a concentration of 2% by weight to the nonaqueous electrolytic solution. The measurement of the battery characteristics after 200 cycles revealed that the retention of discharge capacity was 84.2%. The conditions for the preparation of the 18650 battery and the battery characteristics thereof are summarized in Table 1.

Example 9

A nonaqueous electrolytic solution was prepared and then a 18650 battery was manufactured in the same manner as that in Example 1 except that, as the additives, dimethyl oxalate was added to a concentration of 2% by weight and 1,3-propanesultone (PS) was added to a concentration of 4% by weight to the nonaqueous electrolytic solution. The measurement of the battery characteristics after 200 cycles revealed that the retention of discharge capacity was 82.7%. The conditions for the preparation of the 18650 battery and the battery characteristics thereof are summarized in Table 1.

Example 10

A nonaqueous electrolytic solution was prepared and then a 18650 battery was manufactured in the same manner as that in Example 1 except that, as the additives, dimethyl oxalate was added to a concentration of 2% by weight, vinylene carbonate was added to a concentration of 2% by weight and 1,3-propanesultone (PS) was added to a concentration of 2% by weight to the nonaqueous electrolytic solution. The measurement of the battery characteristics after 200 cycles revealed that the retention of discharge capacity was 87.0%. The conditions for the preparation of the 18650 battery and the battery characteristics thereof are summarized in Table 1.

Example 11

A nonaqueous electrolytic solution was prepared and then a 18650 battery was manufactured in the same manner as that in Example 1 except that, as the nonaqueous solvent, ethylene carbonate (EC)/methyl ethyl carbonate (MEC) (volume ratio: 3/7) was used and that, as the additives, dimethyl oxalate was added to a concentration of 2% by weight and vinylene carbonate was added to a concentration of 1% by weight to the nonaqueous electrolytic solution. The measurement of the battery characteristics after 200 cycles revealed that the retention of discharge capacity was 89.1%. The conditions for the preparation of the 18650 battery and the battery characteristics thereof are summarized in Table 1.

Example 12

A nonaqueous electrolytic solution was prepared and then a 18650 battery was manufactured in the same manner as that in Example 1 except that, as the nonaqueous solvent, ethylene carbonate (EC)/methyl ethyl carbonate (MEC) (volume ratio: 3/7) was used and that, as the additives, dimethyl oxalate was added to a concentration of 2% by weight and 1,3-propanesultone (PS) was added to a concentration of 1% by weight to the nonaqueous electrolytic solution. The measurement of the battery characteristics after 200 cycles revealed that the retention of discharge capacity was 88.5%. The conditions for the preparation of the 18650 battery and the battery characteristics thereof are summarized in Table 1.

Example 13

A nonaqueous electrolytic solution was prepared and then a 18650 battery was manufactured in the same manner as that in Example 1 except that, as the nonaqueous solvent, ethylene carbonate (EC)/diethyl carbonate (DEC) (volume ratio: 1/2) was used and that, as the additives, dimethyl oxalate was added to a concentration of 2% by weight, vinylene carbonate was added to a concentration of 1% by weight and 1,3-propanesultone (PS) was added to a concentration of 1% by weight to the nonaqueous electrolytic solution. The measurement of the battery characteristics after 200 cycles revealed that the retention of discharge capacity was 89.0%. The conditions for the preparation of the 18650 battery and the battery characteristics thereof are summarized in Table 1.

Example 14

A nonaqueous electrolytic solution was prepared and then a 18650 battery was manufactured in the same manner as that in Example 1 except that, as the positive electrode active material, $LiMn_2O_4$ was used in place of $LiCoO_2$ and that, as the additives, dimethyl oxalate was added to a concentration of 2% by weight, vinylene carbonate was added to a concentration of 1% by weight and 1,3-propanesultone (PS) was added to a concentration of 1% by weight to the nonaqueous electrolytic solution. The measurement of the battery characteristics after 200 cycles revealed that the retention of discharge capacity was 74.8%. The conditions for the preparation of the 18650 battery and the battery characteristics thereof are summarized in Table 1.

Comparative Example 1

A nonaqueous solvent having a volume ratio of propylene carbonate (PC) to dimethyl carbonate (DMC) of 1:2 was prepared. In this solvent $LiPF_6$ was dissolved to a concentration of 1 M. In this case, none of dialkyl oxalate (such as dimethyl oxalate), vinylene carbonate and 1,3-propanesultone were added to the nonaqueous electrolytic solution. Using the nonaqueous electrolytic solution, a 18650 battery was manufactured in the same manner as that in Example 1. The measurement of the battery characteristics revealed that no charging/discharging occurred.

Comparative Example 2

A nonaqueous solvent having a volume ratio of ethylene carbonate (EC) to diethyl carbonate (DEC) of 3:7 was prepared. In this solvent $LiPF_6$ was dissolved to a concentration of 1 M. In this case, none of dimethyl oxalate, vinylene carbonate and 1,3-propanesultone were added to the nonaqueous electrolytic solution. Using the nonaqueous electrolytic solution, a 18650 battery was manufactured in the same manner as that in Example 1. The measurement of the battery characteristics after 200 cycles revealed that the retention of discharge capacity was 81.3% based on the initial discharge capacity. The conditions for the preparation of the 18650 battery and the battery characteristics thereof are summarized in Table 1.

Comparative Example 3

A nonaqueous solvent having a volume ratio of propylene carbonate (PC) to dimethyl carbonate (DMC) of 1:2 was prepared. In this solvent $LiPF_6$ was dissolved to a concentration of 1 M. To the nonaqueous electrolytic solution, dimethyl oxalate was added to a concentration of 2% by weight, but neither vinylene carbonate nor 1,3-propanesultone was added. Using the nonaqueous electrolytic solution, a 18650 battery was manufactured in the same manner as that in Example 1. The measurement of the battery characteristics after 200 cycles revealed that the retention of discharge capacity was 71.2%. The conditions for the preparation of the 18650 battery and the battery characteristics thereof are summarized in Table 1.

Comparative Example 4

A nonaqueous solvent having a volume ratio of propylene carbonate (PC) to dimethyl carbonate (DMC) of 1:2 was prepared. In this solvent $LiPF_6$ was dissolved to a concentration of 1 M. A 18650 battery was manufactured in the same manner as that in Example 1 except that, as the additive, only vinylene carbonate was added to a concentration of 2% by weight. The measurement of the battery characteristics after 200 cycles revealed that the retention of discharge capacity was 68.9%. The conditions for the preparation of the 18650 battery and the battery characteristics thereof are summarized in Table 1.

Comparative Example 5

A nonaqueous solvent having a volume ratio of propylene carbonate (PC) to dimethyl carbonate (DMC) of 1:2 was prepared. In this solvent $LiPF_6$ was dissolved to a concentration of 1 M. A 18650 battery was manufactured in the same manner as that in Example 1 except that, as the additive, only 1,3-propanesultone was added to a concentration of 2% by weight. The measurement of the battery characteristics after 200 cycles revealed that the retention of discharge capacity was 66.9%. The conditions for the preparation of the 18650 battery and the battery characteristics thereof are summarized in Table 1.

Comparative Example 6

A nonaqueous solvent having a volume ratio of propylene carbonate (PC) to dimethyl carbonate (DMC) of 1:2 was prepared. In this solvent $LiPF_6$ was dissolved to a concentration of 1 M. A 18650 battery was manufactured in the same manner as that in Example 1 except that, as the additive, dimethyl oxalate was added to a concentration of 5% by weight, but neither vinylene carbonate nor 1,3-propanesultone was added. The measurement of the battery characteristics after 200 cycles revealed that the retention of discharge capacity was 81.7%. The conditions for the preparation of the 18650 battery and the battery characteristics thereof are summarized in Table 1.

TABLE 1

| | Positive electrode | Dialkyl oxalate kind of alkyl group | Dialkyl oxalate amount (wt. %) | VC amount (wt. %) | PS amount (wt. %) | Composition of electrolytic solution (volume ratio) | Initial discharge capacity (relative value) | Retention of discharge capacity (%) *1 |
|---|---|---|---|---|---|---|---|---|
| Example 1 | $LiCoO_2$ | dimethyl | 0.5 | 2 | 0 | 1M $LiPF_6$ PC/DMC = 1/2 | 1.00 | 84.2 |
| Example 2 | $LiCoO_2$ | dimethyl | 1 | 2 | 0 | 1M $LiPF_6$ PC/DMC = 1/2 | 1.01 | 85.7 |
| Example 3 | $LiCoO_2$ | dimethyl | 2 | 2 | 0 | 1M $LiPF_6$ PC/DMC = 1/2 | 1.01 | 86.1 |
| Example 4 | $LiCoO_2$ | dimethyl | 4 | 2 | 0 | 1M $LiPF_6$ PC/DMC = 1/2 | 1.01 | 84.3 |
| Example 5 | $LiCoO_2$ | dimethyl | 2 | 0.1 | 0 | 1M $LiPF_6$ PC/DMC = 1/2 | 1.00 | 83.3 |
| Example 6 | $LiCoO_2$ | dimethyl | 2 | 5 | 0 | 1M $LiPF_6$ PC/DMC = 1/2 | 1.01 | 83.4 |
| Example 7 | $LiCoO_2$ | dimethyl | 2 | 0 | 0.1 | 1M $LiPF_6$ PC/DMC = 1/2 | 1.00 | 82.8 |
| Example 8 | $LiCoO_2$ | dimethyl | 2 | 0 | 2 | 1M $LiPF_6$ PC/DMC = 1/2 | 1.01 | 84.2 |
| Example 9 | $LiCoO_2$ | dimethyl | 2 | 0 | 4 | 1M $LiPF_6$ PC/DMC = 1/2 | 1.01 | 82.7 |
| Example 10 | $LiCoO_2$ | dimethyl | 2 | 2 | 2 | 1M $LiPF_6$ PC/DMC = 1/2 | 1.02 | 87.0 |
| Example 11 | $LiCoO_2$ | dimethyl | 2 | 1 | 0 | 1M $LiPF_6$ EC/MEC = 3/7 | 1.02 | 89.1 |
| Example 12 | $LiCoO_2$ | dimethyl | 2 | 0 | 1 | 1M $LiPF_6$ EC/MEC = 3/7 | 1.01 | 88.5 |
| Example 13 | $LiCoO_2$ | dimethyl | 2 | 1 | 1 | 1M $LiPF_6$ EC/DEC = 1/2 | 1.01 | 89.0 |
| Example 14 | $LiMn_2O_4$ | dimethyl | 2 | 1 | 1 | 1M $LiPF_6$ PC/DMC = 1/2 | 0.87 | 74.8 |
| Comp. Ex. 1 | $LiCoO_2$ | none | 0 | 0 | 0 | 1M $LiPF_6$ PC/DMC = 1/2 | — | *2 |
| Comp. Ex. 2 | $LiCoO_2$ | none | 0 | 0 | 0 | 1M $LiPF_6$ EC/DEC = 3/7 | 1 | 81.3 |
| Comp. Ex. 3 | $LiCoO_2$ | dimethyl | 2 | 0 | 0 | 1M $LiPF_6$ PC/DMC = 1/2 | 0.99 | 71.2 |
| Comp. Ex. 4 | $LiCoO_2$ | none | 0 | 2 | 0 | 1M $LiPF_6$ PC/DMC = 1/2 | 0.99 | 68.9 |
| Comp. Ex. 5 | $LiCoO_2$ | none | 0 | 0 | 2 | 1M $LiPF_6$ PC/DMC = 1/2 | 0.99 | 66.9 |
| Comp. Ex. 6 | $LiCoO_2$ | dimethyl | 5 | 0 | 0 | 1M $LiPF_6$ PC/DMC = 1/2 | 1.00 | 81.7 |

Notes
*1: Retention of discharge capacity after 200 cycles (%)
*2: Unable to charge/discharge

Example 15

Preparation of Nonaqueous Electrolytic Solution

A nonaqueous solvent having a volume ratio of ethylene carbonate (EC) to γ-butyrolactone (GBL) of 2:8 was used. In this solvent $LiPF_6$ and $LiBF_4$ were dissolved to concentrations of 0.9 M and 0.1 M, respectively, to obtain a nonaqueous electrolytic solution. To the nonaqueous electrolytic solution were further added dimethyl oxalate to a concentration of 5% by weight, vinylene carbonate to a concentration of 2% by weight and 1,3-propanesultone to a concentration of 2% by weight.

Manufacture of Lithium Secondary Battery and Measurement of Battery Characteristics:

Ninety % by weight of $LiCoO_2$ (positive electrode active material), 5% by weight of acetylene black (conductive agent) and 5% by weight of polyvinylidene fluoride (binder) were mixed, to which 1-methyl-2-pyrrolidone as a solvent was further added and mixed. The resulting mixture was applied to an aluminum foil, dried, compression molded and heat treated to prepare a positive electrode. On the other hand, 95% by weight of artificial graphite (negative electrode active material) having a graphite type crystal structure having a lattice spacing ($d_{002}$) of the lattice face (002) of 0.336 nm and 5% by weight of polyvinylidene fluoride (binder) were mixed, to which 1-methyl-2-pyrrolidone as a solvent was further mixed. The resulting mixture was applied to a copper foil, dried, compression molded and heat treated to prepare a negative electrode. A cylindrical battery of a 18650 size (diameter: 18 mm, height: 65 mm) was then manufactured using a microporous polypropylene film separator. After pouring of the above electrolytic solution in the battery, carbon dioxide having a dew point of −60° C. was charged before sealing the battery. To the battery were provided a pressure release vent and an internal current cut-off device (PTC device). The positive electrode had an electrode density of 3.4 g/cm$^3$, while the negative electrode had an electrode density of 1.4 g/cm$^3$. The electrode layer of the positive electrode had a thickness (per one side of the collector) of 70 μm, and the electrode layer of the negative electrode had a thickness (per one side of the collector) of 75 μm.

The 18650 battery was charged at ambient temperature (20° C.) with a constant electric current of 0.6 A (0.3 C) to arrive at a voltage of 4.2 V. The charging was thereafter continued for 5 hours in total under a constant voltage with an end voltage of 4.2 V. Next, the battery was discharged with a constant electric current 0.6 A (0.3 C) to an end voltage of 2.8 V. The measurement of the battery characteristics after 200 cycles revealed that the retention of discharge capacity was 81.3%. The conditions for the preparation of the 18650 battery and the battery characteristics thereof are summarized in Table 2.

Example 16

A nonaqueous electrolytic solution was prepared and then a 18650 battery was manufactured in the same manner as that in Example 15 except that, as the additives, dibutyl oxalate was added to a concentration of 4% by weight, vinylene carbonate was added to a concentration of 2% by weight and 1,3-propanesultone was added to a concentration of 2% by weight to the nonaqueous electrolytic solution. The measurement of the battery characteristics after 200 cycles revealed that the retention of discharge capacity was 81.0%. The conditions for the preparation of the 18650 battery and the battery characteristics thereof are summarized in Table 2.

Example 17

A nonaqueous electrolytic solution was prepared and then a 18650 battery was manufactured in the same manner as that in Example 15 except that, as the additives, dihexyl oxalate was added to a concentration of 3% by weight and vinylene carbonate was added to a concentration of 3% by weight to the nonaqueous electrolytic solution, but 1,3-propanesultone was not added thereto. The measurement of the battery characteristics after 200 cycles revealed that the retention of discharge capacity was 81.1%. The conditions for the preparation of the 18650 battery and the battery characteristics thereof are summarized in Table 2.

Example 18

A nonaqueous electrolytic solution was prepared and then a 18650 battery was manufactured in the same manner as that in Example 15 except that, as the additives, dioctyl oxalate was added to a concentration of 2% by weight, vinylene carbonate was added to a concentration of 2% by weight and 1,3-propanesultone was added to a concentration of 2% by weight to the nonaqueous electrolytic solution. The measurement of the battery characteristics after 200 cycles revealed that the retention of discharge capacity was 82.7%. The conditions for the preparation of the 18650 battery and the battery characteristics thereof are summarized in Table 2.

Example 19

A nonaqueous electrolytic solution was prepared and then a 18650 battery was manufactured in the same manner as that in Example 15 except that, as the additives, didodecyl oxalate was added to a concentration of 1% by weight and vinylene carbonate was added to a concentration of 3% by weight to the nonaqueous electrolytic solution, but 1,3-propanesultone was not added thereto. The measurement of the battery characteristics after 200 cycles revealed that the retention of discharge capacity was 80.5%. The conditions for the preparation of the 18650 battery and the battery characteristics thereof are summarized in Table 2.

Comparative Example 7

A nonaqueous electrolytic solution was prepared and then a 18650 battery was manufactured in the same manner as that in Example 15 except that, as the additives, vinylene carbonate was added to a concentration of 3% by weight to the nonaqueous electrolytic solution, but neither dialkyl oxalate nor 1,3-propanesultone was added thereto. The measurement of the battery characteristics after 200 cycles revealed that the retention of discharge capacity was 65.4%. The conditions for the preparation of the 18650 battery and the battery characteristics thereof are summarized in Table 2.

TABLE 2

| | | Dialkyl oxalate | | | | Composition of | Initial discharge | Retention of discharge capacity |
| | Positive electrode | kind of alkyl group | amount (wt. %) | VC amount (wt. %) | PS amount (wt. %) | electrolytic solution (volume ratio) | capacity (relative value) | after 200 cycles (%) |
| --- | --- | --- | --- | --- | --- | --- | --- | --- |
| Example 15 | LiCoO$_2$ | dimethyl | 5 | 2 | 2 | 1M (LiPF$_6$/LiBF$_4$ = 9/1) EC/GBL = 2/8 | 1.00 | 81.3 |
| Example 16 | LiCoO$_2$ | dibutyl | 4 | 2 | 2 | 1M (LiPF$_6$/LiBF$_4$ = 9/1) EC/GBL = 2/8 | 1.00 | 81.0 |
| Example 17 | LiCoO$_2$ | dihexyl | 3 | 3 | 0 | 1M (LiPF$_6$/LiBF$_4$ = 9/1) EC/GBL = 2/8 | 1.00 | 81.1 |
| Example 18 | LiCoO$_2$ | dioctyl | 2 | 2 | 2 | 1M (LiPF$_6$/LiBF$_4$ = 9/1) EC/GBL = 2/8 | 1.00 | 82.7 |
| Example 19 | LiCoO$_2$ | didodecyl | 1 | 3 | 0 | 1M (LiPF$_6$/LiBF$_4$ = 9/1) EC/GBL = 2/8 | 1.00 | 80.5 |
| Comp. Example 7 | LiCoO$_2$ | none | 0 | 3 | 0 | 1M (LiPF$_6$/LiBF$_4$ = 9/1) EC/GBL = 2/8 | 0.97 | 65.4 |

Examples 20 and 21

Evaluation of Wettability

The wettability was evaluated by the following method. That is, an electrolytic solution obtained by adding each of various dialkyl oxalates in a predetermined amount to a solution containing 1 M $LiPF_6$ in a solvent of vinylene carbonate (VC)/γ-butyrolactone (GBL) of 2.5/97.5 (volume ratio) (VC/GBL weight ratio of 3/97) was evaluated for its impregnation efficiency, as wettability, into a separator (CELGARD® #2500 manufactured by Celgard Inc.; microporous polypropylene film). The impregnation efficiency was evaluated with naked eyes after impregnating the separator with the electrolytic solution for 20 seconds.

The results are summarized in Table 3. In Table 3, the symbols A to D indicate as follows:

A: completely wetted

B: fairly wetted

C: slightly wetted

D: not wetted

From the results shown in Table 3, it is appreciated that the dialkyl oxalates containing an alkyl group having 6 or more carbon atoms as an alcohol residue have higher affinity to the separator in comparison with dimethyl oxalate containing an alkyl group having 2 carbon atoms as an alcohol residue or dibutyl oxalate containing an alkyl group having 4 carbon atoms as an alcohol residue and, therefore, when it is placed in contact with a microporous separator, penetrate swiftly into the porous structure of the separator. This follows that the time required in the step for manufacturing the lithium secondary batteries can be reduced. Namely, in the manufacture of a lithium secondary battery, an electrolytic solution is filled in a battery container after a laminate composed of a positive electrode sheet, a separator and a negative electrode sheet is disposed therein. Thereafter, the battery container is closed with a lid. In this case, it is necessary that the closure with the lid must be performed after the electrolytic solution has replaced air contained within the microporous structure of the separator and has filled in the microporous structure. Therefore, by using an electrolytic solution capable of penetrating in the microporous structure within a short period of time, the time for manufacturing lithium secondary batteries can be reduced.

TABLE 3

|  | Example 20 | Example 21 |
|---|---|---|
| Weight (%) | 3 | 2 |
| Dimethyl oxalate | D | D |
| Dibutyl oxalate | C | D |
| Dihexyl oxalate | B | C |
| Dioctyl oxalate | A | B |
| Didecyl oxalate | A | B |
| Didodecyl oxalate | A | B |

Example 22

Preparation of Nonaqueous Electrolytic Solution

A nonaqueous solvent having a volume ratio of propylene carbonate (PC) to dimethyl carbonate (DMC) of 1:2 was prepared. In this solvent $LiPF_6$ was dissolved to a concentration of 1 M to obtain a nonaqueous electrolytic solution. To the nonaqueous electrolytic solution were further added methyl ethyl oxalate to a concentration of 1% by weight and vinylene carbonate (VC) to a concentration of 2% by weight as the additive.

Manufacture of Lithium Secondary Battery and Measurement of Battery Characteristics:

Ninety % by weight of $LiCoO_2$ (positive electrode active material), 5% by weight of acetylene black (conductive agent) and 5% by weight of polyvinylidene fluoride (binder) were mixed, to which 1-methyl-2-pyrrolidone as a solvent was further added and mixed. The resulting mixture was applied to an aluminum foil, dried, compression molded and heat treated to prepare a positive electrode. On the other hand, 95% by weight of artificial graphite (negative electrode active material) having a graphite type crystal structure having a lattice spacing ($d_{002}$) of the lattice face (002) of 0.336 nm and 5% by weight of polyvinylidene fluoride (binder) were mixed, to which 1-methyl-2-pyrrolidone as a solvent was further mixed. The resulting mixture was applied to a copper foil, dried, compression molded and heat treated to prepare a negative electrode. A cylindrical battery of a 18650 size (diameter: 18 mm, height: 65 mm) was then manufactured using a microporous polypropylene film separator. After pouring of the above electrolytic solution in the battery, carbon dioxide having a dew point of −60° C. was charged before sealing the battery. To the battery were provided a pressure release vent and an internal current cut-off device (PTC device). The positive electrode had an electrode density of 3.4 g/cm³, while the negative electrode had an electrode density of 1.4 g/cm³. The electrode layer of the positive electrode had a thickness (per one side of the collector) of 70 μm, and the electrode layer of the negative electrode had a thickness (per one side of the collector) of 75 μm.

The 18650 battery was charged at ambient temperature (20° C.) with a constant electric current of 0.6 A (0.3 C) to arrive at a voltage of 4.2 V. The charging was thereafter continued for 5 hours in total under a constant voltage with an end voltage of 4.2 V. Next, the battery was discharged with a constant electric current 0.6 A (0.3 C) to an end voltage of 2.8 V. The charge-discharge cycles were repeated. The initial discharge capacity was 1.01 when compared with a battery in which a nonaqueous electrolytic solution containing 2% by weight of dimethyl malonate in place of dialkyl oxalate and using 1M $LiPF_6$ and EC/DEC (3/7 volume ratio) was used (Comparative Example 9). The measurement of the battery characteristics after 200 cycles revealed that the retention of discharge capacity was 86.3%. The conditions for the preparation of the 18650 battery and the battery characteristics thereof are summarized in Table 4.

Example 23

A nonaqueous electrolytic solution was prepared and then a 18650 battery was manufactured in the same manner as that in Example 22 except that, as the additives, methyl ethyl oxalate was added to a concentration of 2% by weight and 1,3-propanesultone was added to a concentration of 2% by weight to the nonaqueous electrolytic solution. The measurement of the battery characteristics after 200 cycles revealed that the retention of discharge capacity was 85.1%. The conditions for the preparation of the 18650 battery and the battery characteristics thereof are summarized in Table 4.

Example 24

A nonaqueous electrolytic solution was prepared and then a 18650 battery was manufactured in the same manner as that in Example 22 except that, as the nonaqueous solvent, ethylene carbonate (EC)/methyl ethyl carbonate (MEC) (volume ratio: 3/7) was used and that, as the additives, methyl ethyl oxalate was added to a concentration of 2% by weight and vinylene carbonate was added to a concentration of 1% by weight to the nonaqueous electrolytic solution. The measurement of the battery characteristics after 200 cycles revealed that the retention of discharge capacity was 89.4%. The conditions for the preparation of the 18650 battery and the battery characteristics thereof are summarized in Table 4.

Example 25

A nonaqueous electrolytic solution was prepared and then a 18650 battery was manufactured in the same manner as that in Example 22 except that, as the nonaqueous solvent, ethylene carbonate (EC)/methyl ethyl carbonate (MEC) (volume ratio: 3/7) was used and that, as the additives, methyl ethyl oxalate was added to a concentration of 2% by weight and 1,3-propanesultone was added to a concentration of 1% by weight to the nonaqueous electrolytic solution. The measurement of the battery characteristics after 200 cycles revealed that the retention of discharge capacity was 88.9%. The conditions for the preparation of the 18650 battery and the battery characteristics thereof are summarized in Table 4.

Example 26

A nonaqueous electrolytic solution was prepared and then a 18650 battery was manufactured in the same manner as that in Example 22 except that, as the nonaqueous solvent, ethylene carbonate (EC)/diethyl carbonate (DEC) (volume ratio: 1/2) was used and that, as the additives, methyl ethyl oxalate was added to a concentration of 2% by weight, vinylene carbonate was added to a concentration of 1% by weight and 1,3-propanesultone was added to a concentration of 1% by weight to the nonaqueous electrolytic solution. The measurement of the battery characteristics after 200 cycles revealed that the retention of discharge capacity was 90.2%. The conditions for the preparation of the 18650 battery and the battery characteristics thereof are summarized in Table 4.

Comparative Example 8

A nonaqueous electrolytic solution was prepared in the same manner as that in Example 22 except that, as the additives, dimethyl malonate was used in an amount of 2% by weight in place of the dialkyl oxalate, such as methyl ethyl oxalate, and that neither vinylene carbonate nor 1,3-propanesultone was used. Using the nonaqueous electrolytic solution, a 18650 battery was manufactured in the same manner as that in Example 22. The measurement of the battery characteristics revealed that no charging/discharging occurred.

Comparative Example 9

A nonaqueous electrolytic solution was prepared and then a 18650 battery was manufactured in the same manner as that in Example 22 except that, as the nonaqueous solvent, ethylene carbonate (EC)/diethyl carbonate (DEC) (volume ratio: 3/7) was used and that, as the additives, dimethyl malonate was used in an amount of 2% by weight in place of the dialkyl oxalate, such as methyl ethyl oxalate, and that neither vinylene carbonate nor 1,3-propanesultone was used. The measurement of the battery characteristics after 200 cycles revealed that the retention of discharge capacity was 78.4%. The conditions for the preparation of the 18650 battery and the battery characteristics thereof are summarized in Table 4.

TABLE 4

| | Positive electrode | Dialkyl oxalate | | VC amount (wt. %) | PS amount (wt. %) | Composition of electrolytic solution (volume ratio) | Initial discharge capacity (relative value) | Retention of discharge capacity after 200 cycles (%) |
| | | kind of alkyl group | amount (wt. %) | | | | | |
|---|---|---|---|---|---|---|---|---|
| Example 22 | LiCoO$_2$ | ethyl-methyl | 1 | 2 | 0 | 1M LiPF$_6$ PC/DMC = 1/2 | 1.01 | 86.3 |
| Example 23 | LiCoO$_2$ | ethyl-methyl | 2 | 0 | 2 | 1M LiPF$_6$ PC/DMC = 1/2 | 1.01 | 85.1 |
| Example 24 | LiCoO$_2$ | ethyl-methyl | 2 | 1 | 0 | 1M LiPF$_6$ EC/MEC = 3/7 | 1.02 | 89.4 |
| Example 25 | LiCoO$_2$ | ethyl-methyl | 2 | 0 | 1 | 1M LiPF$_6$ EC/MEC = 3/7 | 1.01 | 88.9 |
| Example 26 | LiCoO$_2$ | ethyl-methyl | 2 | 1 | 1 | 1M LiPF$_6$ EC/DEC = 1/2 | 1.01 | 90.2 |
| Comp. Example 8 | LiCoO$_2$ | dimethyl malonate | 2 | 0 | 0 | 1M LiPF$_6$ PC/DMC = 1/2 | — | unable to charge/discharge |
| Comp. Example 9 | LiCoO$_2$ | dimethyl malonate | 2 | 0 | 0 | 1M LiPF$_6$ EC/DEC = 3/7 | 1 | 78.4 |

Example 27

A nonaqueous electrolytic solution was prepared and then a 18650 battery was manufactured in the same manner as that in Example 22 except that, as the nonaqueous solvent, ethylene carbonate (EC)/methyl ethyl carbonate (MEC) (volume ratio: 3/7) was used and that, as the additives, methyl ethyl oxalate was added to a concentration of 1% by weight, vinylene carbonate was added to a concentration of 1% by weight and methylpropargyl carbonate (MPC) was added to a concentration of 1% by weight to the nonaqueous electrolytic solution. The initial discharge capacity was 1.02 when compared with a battery in which a nonaqueous electrolytic solution containing 2% by weight of dimethyl malonate in place of dialkyl oxalate and using 1M LiPF$_6$ and EC/DEC (volume ratio: 3/7) was used (Comparative Example 9). The measurement of the battery characteristics after 200 cycles revealed that the retention of discharge capacity was 90.1%.

Example 28

A nonaqueous solvent having a volume ratio of ethylene carbonate (EC) to γ-butyrolactone (GBL) (volume ratio: 2/8) was used. In this solvent $LiPF_6$ and $LiBF_4$ were dissolved to concentrations of 0.9 M and 0.1 M, respectively, to obtain a nonaqueous electrolytic solution. To the nonaqueous electrolytic solution were further added methyl hexyl oxalate to a concentration of 3% by weight and vinylene carbonate was added to a concentration of 3% by weight. Except that the thus obtained solution was used, a 18650 battery was manufactured in the same manner as that in Example 22. The measurement of the battery characteristics after 200 cycles revealed that the retention of discharge capacity was 81.8%. The conditions for the preparation of the 18650 battery and the battery characteristics thereof are summarized in Table 5.

Example 29

A nonaqueous solvent having a volume ratio of ethylene carbonate (EC) to γ-butyrolactone (GBL) (volume ratio: 2/8) was used. In this solvent $LiPF_6$ and $LiBF_4$ were dissolved to concentrations of 0.9 M and 0.1 M, respectively, to obtain a nonaqueous electrolytic solution. To the nonaqueous electrolytic solution were further added methyl octyl oxalate to a concentration of 2% by weight and vinylene carbonate was added to a concentration of 3% by weight. Except that the thus obtained solution was used, a 18650 battery was manufactured in the same manner as that in Example 22. The measurement of the battery characteristics after 200 cycles revealed that the retention of discharge capacity was 82.3%. The conditions for the preparation of the 18650 battery and the battery characteristics thereof are summarized in Table 5.

Example 30

A nonaqueous solvent having a volume ratio of ethylene carbonate (EC) to γ-butyrolactone (GBL) (volume ratio: 2/8) was used. In this solvent $LiPF_6$ and $LiBF_4$ were dissolved to concentrations of 0.9 M and 0.1 M, respectively, to obtain a nonaqueous electrolytic solution. To the nonaqueous electrolytic solution were further added methyl dodecyl oxalate to a concentration of 1% by weight and vinylene carbonate was added to a concentration of 3% by weight. Except that the thus obtained solution was used, a 18650 battery was manufactured in the same manner as that in Example 22. The measurement of the battery characteristics after 200 cycles revealed that the retention of discharge capacity was 81.2%. The conditions for the preparation of the 18650 battery and the battery characteristics thereof are summarized in Table 5.

Examples 31 and 32

The wettability was evaluated in the same manner as described in Example 20 using methyl hexyl oxalate, methyl octyl oxalate and methyl dodecyl oxalate as a dialkyl oxalate in varying amounts.

The results are summarized in Table 6. In Table 6, the symbols A to C indicate as follows:

A: completely wetted

B: fairly wetted

C: slightly wetted

The results shown in Table 6 indicate that each of methyl hexyl oxalate, methyl octyl oxalate and methyl dodecyl oxalate exhibited excellent wettability and that particularly methyl octyl oxalate and methyl dodecyl oxalate exhibited excellent wettability even when used in a small amount.

TABLE 6

|  | Example 31 | Example 32 |
|---|---|---|
| Weight (%) | 3 | 2 |
| Methyl hexyl oxalate | B | C |
| Methyl octyl oxalate | A | B |
| Methyl dodecyl oxalate | A | B |

The foregoing examples pertain to 18650 batteries. However, the present invention may be applied also to cylindrical, prismatic and laminate-type batteries.

INDUSTRIAL APPLICABILITY

According to the present invention, there can be provided a lithium secondary battery which is excellent in long-term cycle property and in battery characteristics, such as electric capacity and storage property, and a nonaqueous electrolytic solution usable for such a lithium secondary battery.

The invention claimed is:

1. A lithium secondary battery, comprising:
a positive electrode, a negative electrode, and a nonaqueous electrolytic solution comprising an electrolyte salt dissolved in a nonaqueous solvent, wherein
said positive electrode comprises a material including a lithium compound oxide,
said negative electrode comprises a material including graphite, and

TABLE 5

|  | Positive electrode | Dialkyl oxalate kind of alkyl group | amount (wt. %) | VC amount (wt. %) | PS amount (wt. %) | Composition of electrolytic solution (volume ratio) | Initial discharge capacity (relative value) | Retention of discharge capacity after 200 cycles (%) |
|---|---|---|---|---|---|---|---|---|
| Example 28 | LiCoO$_2$ | hexyl-methyl | 3 | 3 | 0 | 1M (LiPF$_6$/LiBF$_4$ = 9/1) EC/GBL = 2/8 | 1.00 | 81.8 |
| Example 29 | LiCoO$_2$ | octyl-methyl | 2 | 3 | 0 | 1M (LiPF$_6$/LiBF$_4$ = 9/1) EC/GBL = 2/8 | 1.00 | 82.3 |
| Example 30 | LiCoO$_2$ | dodecyl-methyl | 1 | 3 | 0 | 1M (LiPF$_6$/LiBF$_4$ = 9/1) EC/GBL = 2/8 | 1.00 | 81.2 | said nonaqueous electrolytic solution further comprising 0.01 to 10% by weight of an asymmetric dialkyl oxalate having two different alkyl groups and 0.01 to 20% by weight of vinylene carbonate and/or 0.01 to 20% by weight of 1,3-propanesultone, each based on the weight of said nonaqueous electrolytic solution.

2. The lithium secondary battery according to claim 1, wherein the asymmetric dialkyl oxalate is methyl ethyl oxalate.

3. The lithium secondary battery according to claim 1, wherein said nonaqueous solvent is a combination of a cyclic carbonate with a linear carbonate or a combination of a cyclic carbonate with a lactone.

4. The lithium secondary battery according to claim 3, wherein said linear carbonate comprises methyl ethyl carbonate.

5. The lithium secondary battery according to claim 1, wherein said nonaqueous solvent is a combination of propylene carbonate with dimethyl carbonate, a combination of ethylene carbonate with methyl ethyl carbonate, a combination of ethylene carbonate with diethyl carbonate or a combination of ethylene carbonate with γ-butyrolactone.

6. The lithium secondary battery according to claim 1, wherein said graphite has a lattice spacing ($d_{002}$) of the lattice face (002) of 0.340 nm or less.

7. The lithium secondary battery according to claim 1, wherein the positive electrode active material is a lithium compound metal oxide showing an open circuit voltage of at least 4.3 V on the basis of Li after completion of charging.

8. The lithium secondary battery according to claim 1, wherein the electrolyte salt is $LiPF_6$, $LiBF_4$, $LiClO_4$, lithium salts containing linear alkyl groups, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$ or lithium salts having a cyclic alkylene group or $(CF_2)_2(SO_2)_2NLi$ or $(CF_2)_3(SO_2)_2NLi$.

9. The lithium secondary battery according to claim 1, wherein the positive electrode comprises a positive lithium compound on an electron conductive material.

10. The lithium secondary battery according to claim 9, wherein the positive lithium compound is $LiCoO_2$, $LiMn_2O_4$, $LiNiO_2$, $LiCO_{1-x}Ni_xO_2$ ($0.01<x<1$), or a mixture of $LiCoO_2$ with $LiMn_2O_4$, a mixture of $LiCoO_2$ and $LiNiO_2$ or a mixture of $LiMn_2O_4$ and $LiNiO_2$.

11. The lithium secondary battery according to claim 9, wherein the electron conductive material is a natural graphite, an artificial graphite, acetylene black, ketjen black, channel black, furnace black, lamp black or thermal black.

12. The lithium secondary battery according to claim 1, wherein the battery further comprises a separator that has a porosity of 30 to 60%.

13. The lithium secondary battery according to claim 1, wherein the battery further comprises a separator that has an air permeability of 50 to 1000 seconds/100 cc.

14. The lithium secondary battery according to claim 1, wherein the battery further comprises a separator that has a thickness of 5 to 50 μm.

15. The lithium secondary battery according to claim 1, wherein the thickness of an electrode layer of the positive electrode ranges from 30 to 120 μm.

16. The lithium secondary battery according to claim 1, wherein the thickness of an electrode layer of the negative electrode ranges from 1 to 100 μm.

17. The lithium secondary battery according to claim 1, wherein the density of the positive electrode formed as a positive electrode mixture layer on an aluminum foil is 3.2 to 4.0 g/cm$^3$, and wherein the density of the negative electrode formed as a negative electrode mixture layer on a copper foil is 1.3 to 2.0 g/cm$^3$.

18. The lithium secondary battery according to claim 1, wherein the asymmetric dialkyl oxalate is a dialkyl oxalate having a methyl group and an alkyl group having 2 to 4 carbon atoms, a dialkyl oxalate having an ethyl group and an alkyl group having 3 to 4 carbon atoms, or a dialkyl oxalate having an alkyl group having 1 or 2 carbon atoms and an alkyl group having 6 to 12 carbon atoms.

19. The lithium secondary battery according to claim 18, wherein the asymmetric dialkyl oxalate is methyl ethyl oxalate, methyl propyl oxalate or methyl butyl oxalate.

20. The lithium secondary battery according to claim 18, wherein the asymmetric dialkyl oxalate is methyl hexyl oxalate, methyl heptyl oxalate, methyl octyl oxalate, methyl nonyl oxalate, methyl decyl oxalate, methyl undecyl oxalate, methyl dodecyl oxalate, ethyl hexyl oxalate, ethyl octyl oxalate, ethyl decyl oxalate or ethyl dodecyl oxalate.

21. A nonaqueous electrolytic solution for a lithium secondary battery comprising a positive electrode and a negative electrode, said nonaqueous electrolytic solution comprising an electrolyte salt dissolved in a nonaqueous solvent, 0.01 to 10% by weight of an asymmetric dialkyl oxalate having two different alkyl groups and 0.01 to 20% by weight of vinylene carbonate and/or 0.01 to 20% by weight of 1,3-propanesultone, each based on the weight of said nonaqueous electrolytic solution.

* * * * *